Nov. 26, 1929.                G. B. POLLOCK                1,737,021
                    METHOD OF MAKING COMPOSITE PICTURES
                    Filed Nov. 23, 1926         2 Sheets-Sheet 1
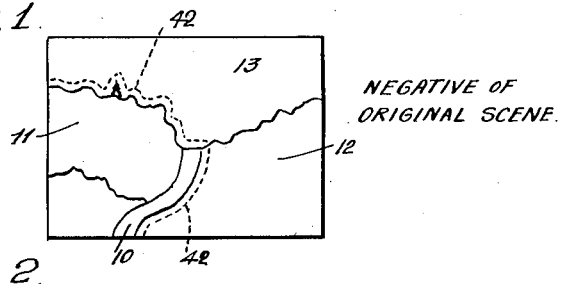
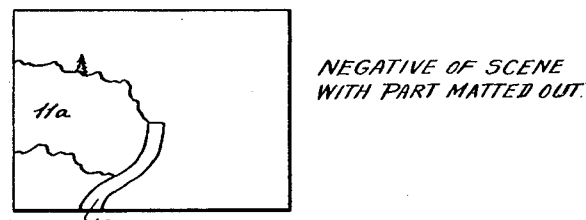
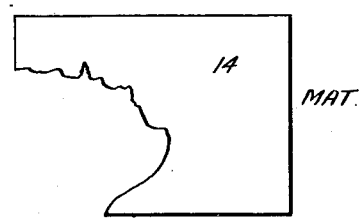
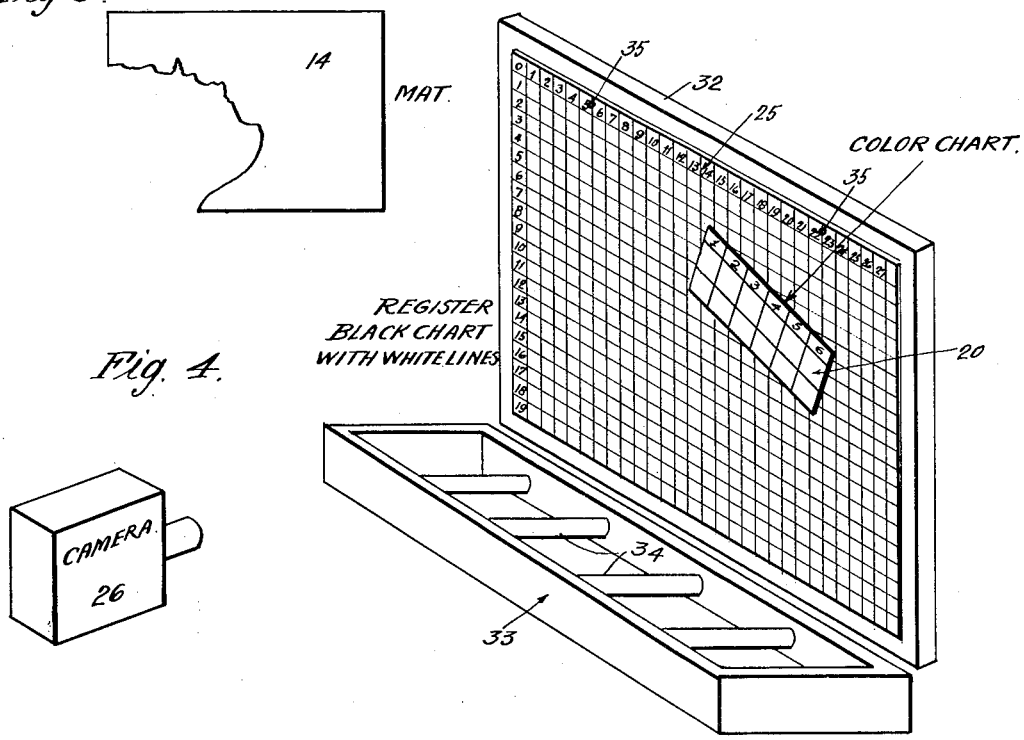
Inventor
Gordon B. Pollock.
Attorney.

Nov. 26, 1929.                G. B. POLLOCK                 1,737,021
                    METHOD OF MAKING COMPOSITE PICTURES
                         Filed Nov. 23, 1926        2 Sheets-Sheet 2
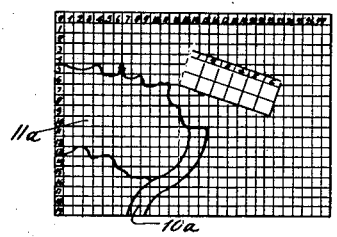
TEST NEGATIVE EXPOSED TO
REGISTER CHART AND COLOR CHART.
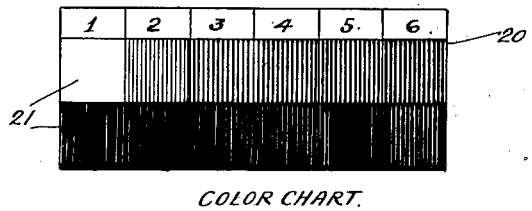
COLOR CHART.
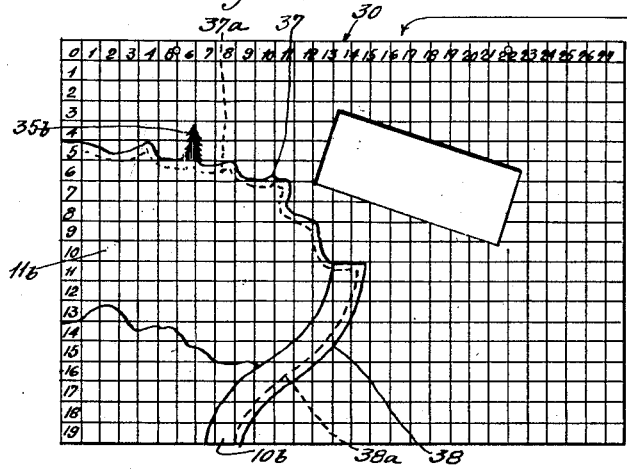
ENLARGMENT OF TEST NEGATIVE WITH
COLOR CHART IMAGE CUT OUT.
ENLARGED IMAGE OF COLOR CHART.
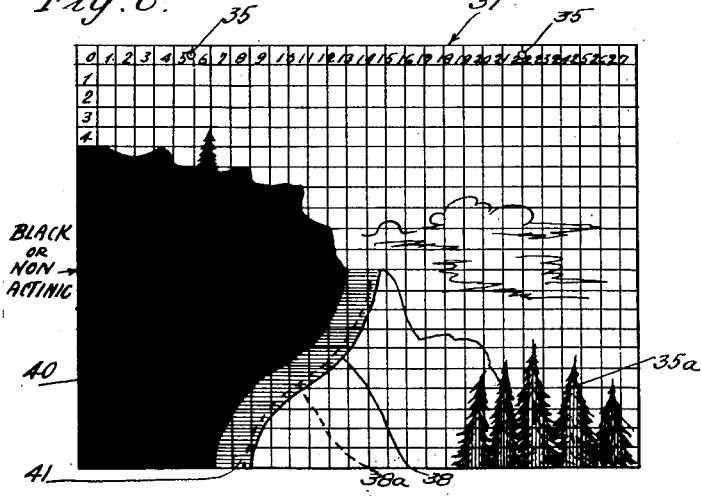
PAINTING TO FILL OUT UNEXPOSED PART OF NEGATIVE.
FINISHED NEGATIVE.
Inventor
Gordon B. Pollock.
Attorney.

Patented Nov. 26, 1929

1,737,021

UNITED STATES PATENT OFFICE

GORDON B. POLLOCK, OF LOS ANGELES, CALIFORNIA

METHOD OF MAKING COMPOSITE PICTURES

Application filed November 23, 1926. Serial No. 150,211.

This invention has to do with the making of what may be termed composite pictures; and although the invention and the typical methods herein described have peculiar utility in motion picture work and will be described more particularly with that work in view, yet the invention is not at all necessarily limited to motion pictures, but may be applied as well to still pictures.

In the production of photographic pictures, and particularly in the production of motion pictures, it is very often desirable to compose in a single scenic effect two or more components derived originally from different sources and perhaps at different times. One of the methods heretofore employed has characteristically involved the actual modification of a scene, the modified scene being then photographed at a single exposure. Such scene modification, which is actually done on the ground or set, has usually been done by preparing a miniature representation of whatever is desired to be added to the natural or otherwise existing scene, the miniature being so proportioned and placed with relation to the camera that although it may be relatively very close to the camera, it appears to be an original part of the scene. This method requires that the composite scene be prepared and photographed at a single exposure. And such a method has involved certain difficulties, among which are difficulties of accurate registration and also of blending the miniature into the natural scene. Although the miniature may be very carefully prepared as regards color values and light and dark tones to blend in the scene under certain lighting conditions, in a good many instances these lighting conditions may be difficult to reproduce when the picture is finally taken.

The major object of my present invention is the provision of certain modes of procedure whereby modification of or additions to a natural or other scene may be made after such scene has been photographed, the additive or modifying work being done entirely in the laboratory, and done with the greatest possible accuracy both as to position registration and as to blending of color values and tones. It will be understood that the composition of scenes in the laboratory, after the original scene or scenes have been photographed, has been practiced in the past; but my invention adds to such procedure an accuracy of color and position registration heretofore unobtainable. Although the foregoing may be termed the major object of the present invention, yet there are other objects and corresponding accomplishments of the invention that are not necessarily limited to the particular and specific kind of work herein described, all as will appear best from the following detailed specification and the subjoined claims.

For the purpose of giving an understanding of the invention, I shall proceed to detailed descriptions of preferred and illustrative procedures, but it will be understood that the invention is not necessarily limited to the specific procedures and details hereinafter set out. These specifically described procedures embody but one concrete form of my invention. Briefly the present form of my invention involves first the exposure of a film, hereinafter termed the original negative, to the scene of which it is desired to use a part or which may be desired to be used entirely but with certain modifications. I will first typically take the case where it is desired to use only a part of a scene and make some additions to that scene to appear in the finally finished photograph. Thus in photographing the original scene the part not desired will be blanked out by some suitable means, as by a suitable mat applied at, in or near the camera, or as by actually rendering non-actinic a part of the scene itself. This last form of blanking out may sometimes be very readily carried out in artificial scenes or "sets" by painting or hanging some non-actinic substance over the part of the scene not desired. The result of this original exposure is thus a latent image on a part of the negative, the remainder at that time being unaffected by light. And it will be understood that this original partially exposed negative may be obtained by suitable partial printing from, or exposure to, a previously taken photograph of the scene.

At the time of or preparatory to the making of this original partially exposed negative, a test negative will have been made by exposure under the same conditions as the original negative. It is this test negative which I use largely in the work about to be described. To all intents and purposes so far as my process is concerned, this test negative is a duplicate of the original negative; the test negative may not have the "action" depicted in it, but for purposes of adding to or modifying the still or background parts of a picture, the presence or absence of the "action" in the test negative is immaterial. A piece of the test negative (I am thinking particularly of motion picture work) is next exposed to what I term a registration chart—a blackboard with white registration lines arranged in some definite relationship. Although the form and relative placement of these lines may be made as desired, I find it practicable to use a rectilinear crossed arrangement of registration lines, and these are preferably numbered for purposes of identification. At the same time that the test film is exposed to this registration board it is also exposed to what I term a color chart, which is a chart carrying the graduations of color or shade which are afterwards used in making the artificial scene that is to be fitted into the original negative. After this exposure the test film is then developed, the development being carried on with a single eye to developing the partial image of the original scene to the desired point, whether that be a point of normal development, under-development or over-development. In other words the piece of test negative is then developed so that the developed image shows exactly as is desired. If the image of the color chart obtained by that development does not show up in its desired and proper graduations of shade or tone, another exposure of another piece of test negative is made in the same way, either by a longer or shorter exposure time, until upon development a piece of test negative is produced that gives the desired development of the image of the original scene and at the same time gives an image of the color chart showing the uniform or other desired graduation of all the shades or tones on the color chart. Such being obtained, the time of exposure, and the factors of development, of that negative are then noted and are afterwards used in the final exposure of the original negative to the artificial scene which is to fill in the previously unexposed part of the original negative.

Then by the use of a duplicate of the registration board, and by use of the photographed image of the color chart, an artificial scene is prepared to fit into the unexposed part of the original image. The details of the procedure used in preparing this artificial scene will be explained hereinafter; but the net result is the production of an artificial scene, conveniently of a size corresponding to the size of registration board, and to which artificial scene the original partially exposed negative may then be again exposed without re-exposing the first exposed part. The finally developed negative then shows the complete composite scene just as desired, with an accurate position registration of its component parts and an accurate blending of the tones and shades of the component parts.

For the purpose of a more detailed and specific description of the present embodiment of my invention, I refer to the accompanying drawings, in which:

Fig. 1 is a view showing in simple form the original scene, or the original scene as it might appear if it were wholly photographed;

Fig. 2 likewise shows the partially exposed negative of the original scene with parts of the original scene matted out. This view shows said negative as it would appear if developed at that stage of the procedure;

Fig. 3 shows a form of a mat that may be used for matting out the undesired parts of the original scene shown in Fig. 1;

Fig. 4 shows diagrammatically the arrangement of the camera and the registration board and color chart;

Fig. 5 shows a typical form of color chart;

Fig. 6 shows the original negative (or a piece of the test negative that is the same as the original negative) after it has been exposed to the registration chart and color chart and then developed;

Fig. 7 shows an enlargement of the negative of Fig. 6 with the image of the color chart cut out;

Fig. 8 shows a painting or other artificial scene production prepared to fit into the previously unexposed parts of the original negative; and Fig. 9 shows the finished negative carrying the desired composite image.

Although it will be well understood that my methods and procedures are applicable to a large variety of scenes and that the method is adapted to scenes of various kinds that may be of complicated natures, and scenes that involve motion, for the purpose of simplicity I here choose to speak of a simple natural still scene and show how that scene may be modified or added to as may be desired. Also I wish it understood that although I speak here of negatives and positives in the ordinary sense, the methods and procedures are not necessarily limited to the specific use of negatives and positives at certain points of the procedure, as will be well understood by those skilled in the art. The terms as used in the claims appended are purely relative.

With these understandings, Fig. 1 may be taken to represent what would be a completed negative of some original scene, the negative image showing for instance a road 10, having hills 11 at one side and 12 at the other side. It is desired, for instance, to change the picture as regards its right hand portion and its sky portion 13. (The negatives of Figs. 1, 2, 6 and 9 are shown reversed in the views, for simplicity of illustration and description.) Consequently, a suitable mat 14, or the like, shaped as shown in Fig. 3, may be used in front of the negative when it is exposed to the scene, and the result of that exposure is then a latent image $10^a$ of the road and a latent image $11^a$ of the hills at the left, the remainder of the negative being totally unexposed. In motion picture work pieces of test film are sometimes taken, so that there is certainty as to the exposure time of the original negative. One of the pieces of test film will be exposed under the same conditions as the original negative and thus that piece of test film which is afterwards used in my work is exactly the same as the original negative, such as shown in Fig. 2. However, a short piece of the original films may be used in my process as the test film. Such a test film is a duplicate of the original; and, particularly if it has been made on the same film length with the original, the test film will have the same shrinkage and other physical distortion characteristics as the original. Furthermore this test film is also a duplicate to the extent that it has been made in the same camera and under the same lighting conditions as the original. Whatever lens distortions there may be, are the same in both films; and the photographic records are exactly the same. But, however the two films or pieces of film are produced, the test film is preferably as nearly as possible a duplicate in all respects of the original. This duplicity being the essential characteristic of the original and test films, my invention is not necessarily limited to the preferred mode of obtaining them.

The original latent negative, such as shown in Fig. 2, although usually obtained by exposure in a camera, may as well be obtained by printing exposure to a picture previously taken, the proper mats or equivalents being used. In fact it is immaterial, in the broader aspects of my invention, just how the original latent negative is produced.

For the purpose of my procedures I prepare a color chart such as is shown in Fig. 5, this chart being prepared on any suitable surface, as a card 20, and having several areas covered with pigments of different colors, or different shades or tones, or both. For instance, the test card may be made by covering the several areas 21 with selected paints that are to be used in the final production of the artificial scene component which is to be combined with the original negative. These several shades or colors of paint are preferably selected particularly with a view to good photography and facility of use by an artist. For instance, they will be such shades and colors that to the eye will show a uniform graduation of shade or shade and color from one to the next, and such as will also readily show up in uniform graduation by photographic reproduction. Although of course various colors may be used, I have found that gradations in shade or tone of a blue-gray pigment are well adapted to my procedure. But whatever colors or shades are selected, it will be remembered that those same colors or shades of pigment that are actually put upon the color chart are those used in the preparation of the artificial scene. For purposes of identification the color chart is numbered and the pigments used by the artist are correspondingly numbered so that there may be no confusion. This color chart, such as for instance is shown in Fig. 5, is placed upon the registration chart 25 in any suitable position where the color chart will appear upon the test film in a previously unexposed part of that test film. The previously partially exposed but as yet undeveloped test film is then exposed in camera 26 to the two charts, and when this piece of test film is then developed it carries on it an image of the color chart and an image of the registration chart, the registration lines appearing over the whole face of the film, and superposed upon the images $11^a$ and $10^a$. See Fig. 6.

The registration chart is preferably made up of white lines on a black or non-actinic surface. Consequently the exposure of the test film to the registration chart does not change the images $10^a$ and $11^a$ on the film except to superimpose the black (negative) images of the white registration lines over the images $10^a$ and $11^a$. Consequently these images $10^a$ and $11^a$ will show up in the test negative exactly as they will in the original negative when it is finally developed.

The test negative having thus been exposed to the two charts, it is then developed to the point where the images $10^a$ and $11^a$ show up just as is desired for that particular picture. In this development no attention whatsoever is paid to the development of the color chart image, the operator stopping the development and fixing the film at a point when the images $10^a$ and $11^a$ show up just as may be desired for the best effect. The film thus developed may not show an image of the color chart in which the several areas show a uniform and satisfactory gradation between the several shades of color. For instance, in such a developed piece of test negative the lighter shades on the color chart may then all show up as substantially of the same negative density. If this is the case, then another piece of test film is again exposed to the two charts, the time of exposure being lengthened or shortened, as experience may indicate as desirable, the test film is again developed. This is done until, upon developing the test film with a single eye to proper development of the scene images, the image of the color chart shows a proper gradation between the several shades. Fig. 6 represents such a developed negative. Then the time of exposure by which this proper image of the color chart was produced is noted and the extent of development is also noted. This extent of development is noted either by noting the time period of development in a standard developing solution, or the the strength of developing solution necessary to secure proper development in a standardized time, depending upon the nature of the machines in which the final development of the final film is carried on. These noted factors are then the ones which control the final exposure of the original film and the extent of development of that finally exposed film.

For convenience of carrying on the work an enlargement is then made of the negative of Fig. 6, the enlargement being of such size that the artist may readily note the details of the images and may readily compare the tones and shades of color values between the image of the color chart and the scene images. The exact size of this enlargement is of no consequence as the images and registration lines are enlarged in the same proportions. Thus, for instance, I produce the enlargement 30 such as shown in Fig. 7 carrying the enlarged scene images 11$^b$ and 10$^b$; and then the enlarged image of the color chart is cut out from this enlargement, that enlarged image cut-out being shown in Fig. 7 at 20$^b$. With the use of this enlarged positive 30 and the enlarged positive image 20$^b$ of the color chart, the artist or other person then prepares the artificial scene or scene component that is to be used in filling out the previously unexposed parts of the original negative. For the purpose of this description I shall assume that the artist is making his artificial scene or scene component by method of painting upon a flat surface, but it will be understood that other methods of making such scene may be used, as I refer to later.

A card or any other suitable painting surface 31 is prepared, preferably, although not necessarily, of exactly the same size as the original registration chart 25, this card or other painting surface 31 being provided with registration lines preferably on a white surface. Here again I may say that although I prefer the painting surface to be white, it may be of any other color or shade as may best suit the purposes of the particular picture, but typically it will be white or gray. The color of the registration lines on this painting surface is immaterial, as they are finally removed or covered up entirely; but ordinarily they may be black. As I have said, it is preferred for simplicity to make this painting surface with its registration lines an exact duplicate as to size and line placement of the original registration chart; for, such being the case, the finished picture on surface 31 may then be substituted for the registration chart before camera 26 without changing the relative position of the camera. For purposes of obtaining a set relation of the camera and registration chart or painting, the chart and painting may be mounted upon any suitable support, as for instance a board 32 supported in such a manner as to be definitely fixed in position relative to camera 26. In practice, a supporting device may be used of such a nature as to support camera 26 rigidly and to support board 32 so that it may be moved toward and away from the camera and also be moved laterally, so as to accurately place the board at proper distance from the camera and so as to obtain accurately any lateral adjustment that may be needed. But these physical arrangements need not be illustrated or described here. For illuminating the registration chart and illuminating the painted picture, a light box 33 may be used, preferably provided with lamps 34 giving a predominance of actinic rays.

During the initial exposure of the test film to the charts and the final exposure of the original negative to the finally prepared picture, the lamps are so operated that the illumination is always the same. To register the registration chart and the final picture in exactly corresponding positions on board 32, both the chart and the picture may be provided with registration holes 35, which are in fixed definite relation to the numbered registration lines. Thus when the final painting is prepared in accurate relation to the scene images 11$^b$ and 10$^b$, using the registration lines for that purpose, and when placed in its registered position in the place formerly occupied by the registration chart, its images will occupy exactly the space desired on the film in the final exposure.

In preparing a painting for the purposes of this method, after the painting surface 31 has been prepared as before described with its registration lines, the artist then first lays out carefully on the painting surface either a simple outline or further representation of the original scene images as they are shown in the enlarged positive 30. He is enabled very accurately to lay out such a representation of the original images by reference to the registration lines in the enlargement. Having thus determined and laid out the relative positions which these images would occupy upon his painting surface, he then proceeds to lay out and paint upon the remainder of the painting surface a representation of the scene desired to be composed with the original images. In doing this he will normally first lay out his design to whatever extent he may wish to fill the space and will then proceed, using the paints hereinbefore mentioned, to fill in the design in the colors and shades proper to the representation he is making, and also in such colors and shades as will blend and balance properly with the original images. The manner in which the artist obtains exact place registration will now be understood without the necessity of further detailed description. He obtains exact balance and blend by the use of color chart image $20^b$. For instance there may be in the original image a shade or color value at a particular point, as at $35^b$, as indicated in Fig. 7, and in order to obtain proper balance as to color values the artist may wish to reproduce that particular shade or color value at $35^a$ in his painting. To do this he takes the color chart image $20^b$ and by juxtaposition and careful comparison he notes what area of the color chart image corresponds most nearly or exactly with the shade at $35^b$ in the enlargement 30. Having thus determined a particular area of the color chart image, he notes the number corresponding to that area and then in painting at the point $35^a$ in his painting, he uses the pigment of that same number in so far as he wishes to get that exact shade or color. And likewise in and throughout his painting he will at all its various parts use the pigments that are indicated by the number on the color chart image $20^b$ corresponding to that area of the color chart that matches with some particular part of the original scene images on enlargement 30. And working in this manner it will be seen how the artist obtains results that give a final good balance of color values or shades and tones; and particularly how the artist obtains close correspondence and balance of such color values or shades and tones at the edges of his painting, the photographic images of which edges are finally to be shown in registration with the edge portions of the original scene images. In all this work it will be noted that the artist is using a photographic image of the color chart, and not the color chart itself. He is making comparisons between a color image and a scene image both of which have been produced under identic photographic conditions, those photographic conditions being again the same as those under which his finished painting is to be photographically reproduced. Consequently, he is sure at every step of securing proper matching and balance of color and shade or tone.

When the painting is finished, all those parts of the registration lines not covered up are carefully removed from view. The parts corresponding to the original scene images are actinically blocked out, usually by painting over black as shown at 40.

The painting thus having been carefully prepared, it is then placed upon the supporting board 32 in the place formerly occupied by the registration chart; and if the painting work has been accurate as to placement, then the image of the painting will exactly match on the film with the image of the original scene. This exact registration may be tested by making an enlargement of a piece of test film that has been finally exposed and developed. If there is any slight lack of registration, the supporting board 32 may be shifted slightly to obtain exact registration.

When all things are thus prepared, then, the painting being illuminated with the same light intensity as that by which the original color chart was first illuminated, the original partially exposed film, with its latent image of the original scene, is then run through the camera, with the result that the previously unexposed part of the film is then exposed to the painting. The time period of this exposure is fixed by the time period determined by exposure of the test film, as previously referred to. If all the work has been properly done, and it is easy to do the work properly in accordance with my system, the film, when then finally developed to the extent determined in the previous development of the test film, will then show a complete scene image in which the two component parts are registered and blended together in such a manner as to appear as a single original scene taken at a single exposure.

From what has been said it will be readily seen that my procedure is such that film shrinkages do not affect it. The painting or other scene component is prepared by reference to the film itself; and that scene component is then photographed upon the film before it is developed. The film will shrink very little or none in the small time period intervening between its exposure to the registration chart and its final exposure to the prepared scene component. If development of the test film has caused shrinkage, that shrinkage will be proportionate in all directions and also proportionate as regards both the scene images and the registration line images. Consequently proportions in the prepared scene will always be correct; and if there is any slight difference between the absolute size of the original negative and the developed test negative, that difference may be measured and compensated for by moving the painting slightly toward or away from the camera before making the final exposure.

I have described my procedure specifically as using a flat painting on a flat surface 31; but it will be readily understood how the artificial representation on surface 31 may be made in relief, due regard being had to the registration lines; and it will be further understood how I may proceed a step further and substitute for such a flat painting or relief a physical miniature representation of such artificial scenes or objects as it may be desired to incorporate into the final picture. For instance, such miniature representation may be miniature representations of houses or other architectures, boats, miniature representations of persons, trees, or in fact anything else desired. In arranging such miniature representation it will, of course, be recognized that they cannot be placed in or on the plane of such a painting surface as shown at 31, or in the plane of the registration board. Consequently, in arranging such miniature representations, in order to get them accurately registered in position to match with the original scene images, they may be arranged against or in front of such a lined surface as shown at 31, or even behind such a chart made on glass, but their positions with reference to the registration lines will be determined by viewing them, so to speak, through the eye of the camera. As a simple instance of such use of miniatures, we may suppose that it is desired to place the miniature representation of a house in a certain position in the painted scene shown in Fig. 8. When that painted scene is placed upon the registration board 32, then the miniature is placed in the desired position in front of the painting, that position being determined and adjusted by viewing the painting and miniature through the camera lens or its equivalent. In practice, this may be done by looking at the film through a finder or focusing instrument, or by taking an exposure and enlarging. When such a miniature is prepared and properly arranged for registration, a mat may be used to prevent re-exposure of the previously exposed part of the negative; or a non-actinic fabric may be arranged around the miniature, or any of the other means of blocking out herein mentioned may be used.

In fact, the nature of the additive scene component is more or less immaterial to the operation of my method. I have used the word "artificial" in that regard because the additive component will usually be such. But even that is not necessarily the case nor is it necessarily the case that such component be especially prepared. For instance, by selection and by making the same comparisons as to color and shade as before described, a natural scene might be found that will satisfactorily compose with the original scene component.

In case it is desired not only to add to the original scene image, but also to modify it, that may be easily done in accordance with my procedure. For instance, suppose in the original negative image 10ª of the road would be too light—the final positive would show the road too dark in general tone, and it is desired to lighten up the final image of the road. In that case the artist, when he blacks out the part of his painting corresponding to the original scene images, will not completely black out the part corresponding to the original image of the road. He may black out, for instance, as shown at 40 in Fig. 8, the part of his painting corresponding to the hills at the left of the road, but he will then apply to the part corresponding to the road image a tone of pigment that is some shade lighter than black or non-actinic. This, for instance, is indicated at 41 in Fig. 8. In the final exposure of the film to the painted picture, the image of the road will then receive some additional light, with the result that the final road image in the final positive will appear lighter in tone than would otherwise be the case. Other applications of such modification will immediately occur to those skilled in the art. For instance, if the original scene contained a window and it is desired to show that window more highly flooded with light than is actually the case in the original scene, the part of the artist's painting corresponding with that window would not be black or actinically blacked out, but will be covered with a pigment of some lighter shade so as to correspondingly modify the image of the window in the final positive. And not only can modifications of color value or shades of light and darkness be thus modified, but objects may be actually inserted in the image of the original scene. And it will be readily understood that such objects, if they can be represented in tones that will obliterate the registering tones of the original image, may be inserted into the original image without any phantom effect; and at any point in the original image phantom images may be inserted as desired.

In the use of mats at or near the camera—such a mat is shown at 14 in Fig. 3—it is well understood in the art that a perfectly sharp and clear line of demarkation between the originally exposed and unexposed parts of a negative is not obtained. Such mats are usually not placed in a focal plane but are usually in practice placed before the lens. While a fairly sharp line of demarkation may thus be obtained, it is impossible to obtain a completely sharp line, but the line of the mat is then represented in the film by a band that shades off from edge to edge. Thus we may suppose that in Fig. 7 the outline lines 37 and 38 represent the limits of the area of complete non-exposure in the original exposed film. Inside these lines there will then be a band, whose inner edge is diagrammatically represented by the dotted lines 37ª and 38ª, and in this band the exposure of the film to the original scene is not complete, but shades from complete exposure at the line 38ª to no exposure at the line 38. The artist, in preparing his picture, may compensate for this band by reversely shading that part of his painted representation, for instance, between the lines 38 and 38ª shown in Fig. 8. The shading of this band in the positive of Fig. 7 will be from dark to light, proceeding from line 38 to line 38ª. The artist will thus shade his painted band from light to dark, proceeding from line 38 to the line 38ª in Fig. 8. And in doing that, he will preferably more or less reproduce in his shaded band the variations of image shades and color values that occur in the shaded band in enlarged positive 30.

Another method of compensating for the shaded band is to use a mat complementary to mat 14 when the film is exposed to the painting or other prepared scene. In such a case the artist will run his painting over the line 38 into the original image area, reproducing in that part the corresponding part of the original image. Then by using the complementary mat in front of the camera, the shaded band caused by that mat compensates the shaded band caused by the first mat.

On the other hand, the shaded bands may be entirely eliminated by using mats or masks or equivalent blanking out arrangements such as will give a perfectly sharp line of demarkation between the exposed and unexposed portions of the original negative. For instance, suppose that the original scene, such as depicted in Fig. 1 is not to be photographed from an actual natural scene, but from a flat representation of that scene, such as a painting or the like. In that case, a suitable non-actinic surface may be placed directly upon the original painting with an edge contour such as to exactly cover the parts 12 and 13 of that painting that are not desired in the final picture. Such a non-actinic surface, being in a focal plane, will give a perfectly sharp line of demarkation and may be applied to the original painting very accurately. On the other hand, if it is not desired to go to the work of covering the whole of surface 12 and 13 in the original painting, a band of some suitable non-actinic substance, such as black velvet, may be arranged around the edges of the surface parts 12 and 13, such a band being indicated in dotted lines at 42 in Fig. 1. If this band is sufficiently wide to cover the area corresponding to the shaded band of which I have before spoken, then a mat such as shown at 14 in Fig. 3 may be used at the camera, with its contour such as to entirely cut out exposure of the remaining parts of surfaces 12 and 13, the shaded band that would come at the edge of the mat then falling in the area corresponding to the band 42 actually placed upon the original painting. By this means a perfectly sharp line of remarkation is obtained. And it will now be understood from what I have said regarding blocking out that the methods last explained with regard to painting may be readily applied to ordinary scenery or ordinary backgrounds such as are usually termed "sets" in motion picture work.

From a consideration of the nature of the color chart and its images and the uses which I have now described, it will be readily understood that the use of such a color chart and its image is not necessarily restricted to the particular kind of process or procedure that I have here described. The function and utility of the color chart is to enable the artist or other person to determine just what color value or shade or tone will exactly or very closely match with a photographed image. And this is done by using both an original color chart and an image of that color chart photographed and developed along with the image of the scene or other thing whose color values, tones or shades are desired to be matched. Consequently it will readily be seen that the system involved in the color chart and its use may be applied to many other situations wherein it is desired for any reason to match color values, tones or shades. And my system as a whole, or the color registration part of it, may also be particularly applicable to working with color pictures, either moving or still. As applied to color pictures, the color chart and its image, enable accurate registration not only of photographic time, but also of the colors themselves, and their depths.

While I have explained the procedure in simple form, it will readily be seen that it is applicable to more complicated situations. For instance, the procedure is no different if the original scene contains motion as it usually does in motion picture work. Furthermore the procedure is not limited to the composition of only two scene components; by simple repetition it may be used to compose three or more.

I claim:

1. The method of producing a composite photograph, that includes first producing by partial exposure two duplicate undeveloped negatives carrying on exposed portions duplicate latent images of a scene desired as a component of the finished composite photograph, a part of each negative being unexposed, exposing one of said negatives to registration lines and developing, preparing an additive scene, by reference to the showing of the registration lines on the developed negative, to match with the unexposed part on the other undeveloped negative, exposing said last mentioned negative in its previously unexposed part to said additive scene, and developing the last mentioned negative.

2. The method of producing a composite photograph, that includes first producing by partial exposure two duplicate undeveloped negatives carrying on exposed portions duplicate latent images of a scene desired as a component of the finished composite photograph, a part of each negative being unexposed, exposing one of said negatives to registration lines and developing, preparing a miniature additive scene, by reference to the showing of the registration lines on the developed negative, to match with the unexposed part on the other undeveloped negative, exposing said last mentioned negative in its previously unexposed part to said additive scene, and developing the last mentioned negative.

3. The method of producing a composite photograph, that includes first producing by partial exposure two duplicate undeveloped negatives carrying on exposed portions duplicate latent images of a scene desired as a component of the finished composite photograph, a part of each negative being unexposed, exposing one of said negatives to registration lines and developing, making a positive enlargement of said developed negative, preparing a miniature additive scene, by reference to said enlargement and the registration lines thereof, to match with the unexposed part on the other undeveloped negative, exposing said last mentioned negative in its previously unexposed part to said additive scene, and developing the last mentioned negative.

4. The method of producing a composite photograph, that includes first producing by partial exposure two duplicate undeveloped negatives carrying on exposed portions duplicate latent images of a scene desired as a component of the finished composite photograph, a part of each negative being unexposed, exposing one of said negatives to registration lines and developing, making a positive enlargement of said developed negative, preparing an additive scene, by reference to said enlargement and the registration lines thereof, to match with the unexposed part on the other undeveloped negative, exposing said last mentioned negative in its previously unexposed part to said additive scene, and developing the last mentioned negative.

5. The method of producing a composite photograph, that includes first producing by partial exposure two duplicate undeveloped negatives carrying on exposed portions duplicate latent images of a scene desired as a component of the finished composite photograph, a part of each negative being unexposed, exposing one of said negatives in a camera to registration lines, the relation of the camera to the registration lines being fixed, developing the exposed negative, making an enlarged positive of said developed negative, preparing a scene background with lines in duplication of the registration lines, preparing an additive scene against said background, by reference to the scene and registration line images on the positive enlargement, to correspond with the unexposed parts of the other negative which is still undeveloped, the parts of said background except those occupied by the additive scene being rendered non-actinic, substituting the prepared scene in place of the registration lines before the camera, exposing said last mentioned undeveloped negative in the camera to the prepared scene, and developing said last mentioned negative.

6. The method of producing a composite photograph, that includes first producing by partial exposure two duplicate undeveloped negatives carrying on exposed portions duplicate latent images of a scene desired as a component of the finished composite photograph, a part of each negative being unexposed, exposing one of said negatives to registration lines and exposing the same said negative in a previously unexposed part to a color chart under a predetermined illumination, said color chart having area showing graduations of color changes, developing said exposed negative and thereby obtaining a negative having an image of the original scene component, an image of the registration lines and an image of the color chart, making an enlarged positive of said developed negative, removing the color chart image from said enlarged positive, preparing a painting ground with registration lines in duplicate of the first mentioned registration lines, making on said painting ground, by reference to said positive enlargement and by comparison of the color chart image with the enlarged scene image, and additive scene to correspond with an unexposed part of the other undeveloped negative and to match the images of said negative in shade and color value, the parts of said ground except those occupied by the additive scene being rendered non-actinic, exposing said last mentioned negative to said additive scene under the same illumination as used in exposure of the first mentioned negative to the color chart, and developing the last mentioned negative.

7. The method of producing a composite photograph, that includes first producing by partial exposure two duplicate undeveloped negatives carrying on exposed portions duplicate latent images of a scene desired as a component of the finished composite photograph, a part of each negative being unexposed, preparing a series of pigments in graduated color values and shades, preparing a color chart carrying areas of said graduated pigments, exposing a previously unexposed part of one of said negatives to said color chart, developing said exposed negative with reference to proper development of the scene image thereon, the time and illumination factor of said exposure being determined as that which will give, upon said development, graduated shade images of said areas of the color chart corresponding with shades in the developed scene image, making an enlarged positive of said developed negative, comparing the color chart image of the positive with the shades of the scene image of the positive and thereby determining the pigments which correspond with said shades, then preparing an additive scene by using pigments determined by such comparison, exposing the other undeveloped negative in its unexposed part to said additive scene under the time and illumination factor determined in the exposure of the color chart, and finally developing the last mentioned negative to the extent determined by the development of the first mentioned negative.

8. The method of producing a composite photograph, that includes first producing by partial exposure two duplicate undeveloped negatives carrying on exposed portions duplicate latent images of a scene desired as a component of the finished composite photograph, a part of each negative being unexposed, preparing a series of pigments in graduated color values and shades, preparing a color chart carrying areas of said graduated pigments, exposing a previously unexposed part of one of said negatives to said color chart, developing said exposed negative with reference to proper development of the scene image thereon, the time and illumination factor of said exposure being determined as that which will give, upon said development, graduated shade images of said areas of the color chart corresponding with shades in the developed scene image, comparing the color chart images with the shades of the scene image and thereby determining the pigments which correspond with said shades, then preparing an additive scene by using pigments determined by such comparison, exposing the other undeveloped negative in its unexposed part to said additive scene under the time and illumination factor determined in the exposure to the color chart, and finally developing the last mentioned negative to the extent determined by the development of the first mentioned negative.

9. The method of producing a composite photograph, that includes first producing by partial exposure two duplicate undeveloped negatives carrying on exposed portions duplicate latent images of a scene desired as a component of the finished composite photograph, portions of both negatives being relatively unexposed, preparing a color chart having a surface displaying a chosen pigment, exposing a previously unexposed portion of one of said negatives to said color chart, developing said exposed negative with reference to proper development of the scene image thereon, the time and illumination factor of said exposure being determined as that which will give, upon said development, an image of the color chart comparable in density with parts of the scene image, then preparing an additive scene by using pigments determined by a comparison of said images, exposing the other undeveloped negative in its unexposed part to said additive scene under the time and illumination factor determined in the exposure of the color chart, and finally developing the last mentioned negative to the extent determined by the development of the first mentioned negative.

10. The method of producing a composite photograph, that includes first producing by partial exposure two duplicate undeveloped negatives carrying on exposed portions duplicate latent images of a scene desired as a component of the finished composite photograph, a part of each negative being unexposed, arranging one of said negatives in fixed relation to photographable registration lines, said lines being registered by physical registering means in a fixed position, exposing said negative to said registration lines and developing said negative, preparing an additive scene on the same scale as that of the registration lines, said additive scene being prepared, by reference to the registration line images on the developed negative, to match with the unexposed part on the other undeveloped negative, placing and registering the prepared scene in the fixed relative position previously occupied by the registration lines and placing the undeveloped negative in the relative position previously occupied by the developed negative, exposing the last mentioned negative in its previously unexposed part to said additive scene, and developing the last mentioned negative.

In witness that I claim the foregoing I have hereunto subscribed my name this 15th day of November, 1926.

GORDON B. POLLOCK.